Patented Dec. 2, 1947

2,432,063

UNITED STATES PATENT OFFICE 2,432,063

SEPARATING PARACRESOL AND PYRIDINE BASE COMPOUNDS THEREOF FROM MIXTURES WITH METACRESOL

Francis E. Cislak and Merritt M. Otto, Indianapolis, Ind., assignors to Reilly Tar & Chemical Corporation, Indianapolis, Ind., a corporation of Indiana No Drawing. Application October 20, 1943, Serial No. 507,017

9 Claims. (Cl. 260—286)

Our invention relates to the separation of paracresol from mixtures containing metacresol and paracresol with the paracresol predominating.

A mixture of metacresol and paracresol, associated with various other phenolic bodies, is obtained in the processing of coal tar. The other phenolic bodies commonly present, including orthocresol, can be separated quite readily and fairly completely from the mixture of metacresol and paracresol by fractional distillation. But the boiling points of the metacresol and the paracresol are so close together that it is not commercially practical to separate them by fractional distillation.

In the mixture of metacresol and paracresol as obtained in the processing of low-temperature coal tar, the paracresol frequently predominates in amount over the metacresol. As obtained in the processing of high-temperature coal tar, the metacresol frequently predominates in amount over the paracresol; however, by various procedures, such for instance as that shown in our copending application Serial No. 493,596, filed July 5, 1943, the paracresol can be made to predominate in amount over the metacresol.

We have found that by treating with a pyridine base of the class of 4-picoline, quinaldine, 2,3,6-collidine, and 2,4-dimethylquinoline, a mixture of metacresol and paracresol containing more paracresol than metacresol, whether or not the mixture also contains small amounts of higher and/or lower related phenolic bodies (such as orthocresol and the xylenols), and cooling, we get a formation of crystals of an addition product of some character composed of one molecule of paracresol and one molecule of 4-picoline or quinaldine or 2,3,6-collidine or 2,4-dimethylquinoline as the case may be. For convenience we shall refer to these addition products as paracresol-pyridine. When treating with 4-picoline or with 2,3,6-collidine the cooling is desirably to a temperature at least as low as —5° C., but rarely needs to be below —15° C.; when treating with quinaldine or with 2,4-dimethylquinoline the cooling is desirably to a temperature as low as 15° C. but rarely needs to be below 5° C. The crystals obtained in any of these cases can readily be recovered, as by decanting or filtering; and can readily be reconverted into substantially pure paracresol, and substantially pure pyridine bases (4-picoline or quinaldine or 2,3,6-collidine or 2,4-dimethylquinoline as the case may be), as by fractional distillation.

Upon the recovery of the crystals of paracresol-pyridine, such as of paracresol-4-picoline or paracresol-quinaldine, by the decanting or filtering above referred to, the mother liquor remaining is much enriched in metacresol, in comparison to the original metacresol-paracresol mixture; and also contains considerable pyridine bases, such as 4-picoline or quinaldine, and some paracresol but not in predominating amount. This mother liquor, after removing the pyridine base, has metacresol in predominating amount, and may be used as a source of metacresol, as by the procedure set forth in our aforesaid copending application Serial No. 493,596 or in our Patent No. 2,310,616, issued February 9, 1943.

The paracresol-4-picoline, the paracresol-quinaldine, the paracresol-2,3,6-collidine, and the paracresol-2,4-dimethylquinoline, are new compounds. The paracresol-4-picoline has a melting point of about 13° C.; the paracresol-quinaldine has a melting point of about 34° C.; the paracresol-2,3,6-collidine has a melting point of about 20° C.; and the paracresol-2,4-dimethylquinoline has a melting point of about 66° C. They are of interest in the preparation of disinfectants and insecticides, as well as in the present process of separating paracresol from metacresol.

The following examples illustrate our invention:

*Example 1.*—One hundred pounds of a commercial mixture of metacresol and paracresol, containing about 55—60% paracresol, is thoroughly mixed with 90–100 pounds of 4-picoline. With these proportions there is a molecular excess of 4-picoline; which we deem desirable, although it is not essential. When the mixing is completed the mixture is cooled to about —5° C. to —15° C. By such cooling the addition product, paracresol-4-picoline, usually crystallizes spontaneously from the mixture, although sometimes it is necessary to start crystallization by seeding with crystals of paracresol-4-picoline. The crystals of paracresol-4-picoline produced by the cooling are suitably separated, most conveniently by filtration or centrifugation. These crystals are subjected to fractional distillation, which decomposes them into paracresol and 4-picoline; whereupon the 4-picoline distills over first, and then at a much higher temperature the paracresol distills over. As so recovered, the paracresol is usually of about 70% to 80% purity. The paracresol thus obtained is sufficiently pure for many uses. If greater purity of the paracresol is desired, however, it is readily obtained by purification of the paracresol-4-picoline from which it was obtained. Conveniently such purification consists in warming the paracresol-4-picoline until it becomes liquid, at about 8° to 13° C.; after which the liquid is cooled to about 0° to 5° C.; whereupon whitish crystals of purified paracresol-4-picoline separate out of the liquid. These purified crystals are separated from the liquid, conveniently by filtration. Upon subjecting these crystals to fractional distillation, a paracresol of 85–90% purity is obtained.

In place of the 4-picoline we can use 2,3,6-collidine.

*Example 2.*—One hundred pounds of a commercial mixture of metacresol and paracresol containing about 55–60% paracresol, is thoroughly mixed with about 145–155 pounds of quinaldine. With these proportions there is a molecular excess of quinaldine; which we deem desirable, although it is not essential. When the mixing is completed the mixture is cooled to about 5° C. to 15° C. By such cooling the addition product, paracresol-quinaldine, usually crystallizes spontaneously from the mixture, although sometimes it is necessary to start crystallization by seeding with crystals of paracresol-quinaldine. The crystals of paracresol-quinaldine produced by the cooling are suitably separated, most conveniently by filtration or centrifugation. These crystals are subjected to fractional distillation, which decomposes them into paracresol and quinaldine, whereupon the paracresol distills over first, and then at a much higher temperature the quinaldine distills over. As so recovered, the paracresol is usually of about 90% to 95% purity. The paracresol thus obtained is sufficiently pure for many uses. If greater purity of the paracresol is desired, however, it is readily obtained by purification of the paracresol-quinaldine from which it was obtained. Conveniently such purification consists in warming the paracresol-quinaldine until it becomes liquid, at about 25° C. to 35° C.; after which the liquid is cooled to about 15° C. to 20° C., whereupon whitish crystals of purified paracresol-quinaldine separate out of the liquid. These purified crystals are separated from the liquid, conveniently by filtration. Upon subjecting these crystals to fractional distillation, in the same manner as described before, a paracresol of 95–98% purity is obtained.

In place of the quinaldine, we can use 2,4-dimethyl-quinoline.

The obtaining of the paracresol by distillation from the paracresol-pyridine, as above described, is our preferred way of obtaining it; but we can obtain it from the paracresol-pyridine in other ways. For example, we can treat paracresol-4-picoline or paracresol-quinaldine with a large excess of an aqueous caustic soda solution, of between 20% and 50% concentration. This decomposes the paracresol-4-picoline or the paracresol-quinaldine to yield an upper layer of 4-picoline or of quinaldine, and a lower layer of paracresol dissolved in aqueous caustic soda. The caustic soda solution of paracresol is separated from the 4-picoline or from the quinaldine by decantation. The paracresol is then liberated from the co-present caustic soda in any convenient manner, as by neutralization of the caustic soda with an acid, conveniently sulfuric acid.

We claim as our invention:

1. The process of separating paracresol from a mixture consisting mainly of metacresol and paracresol with the paracresol predominating, which consists in mixing such a mixture with a pyridine base of the class consisting of 4-picoline, quinaldine, 2,3,6-collidine, and 2,4-dimethylquinoline, and producing in the resulting mixture a sufficiently low temperature to form crystals of an addition product of paracresol and the pyridine base, separating such crystals, and chemically decomposing said crystals to liberate paracresol in purified form.

2. The process of separating paracresol as set forth in claim 1, in which the pyridine base is 4-picoline.

3. The process of separating paracresol as set forth in claim 1, in which the pyridine base is quinaldine.

4. The process of obtaining a compound of paracresol and a pyridine base of the class consisting of 4-picoline, quinaldine, 2,3,6-collidine, and 2,4-dimethylquinoline, which consists in mixing the pyridine base and a mixture consisting mainly of metacresol and paracresol with the paracresol predominating, and producing in the resulting mixture a sufficiently low temperature to form crystals of an addition product of paracresol and the pyridine base, and recovering the crystals from the reaction mixture.

5. The process of obtaining paracresol-4-picoline, which consists in mixing 4-picoline and a mixture consisting mainly of metacresol and paracresol with the paracresol predominating, and producing in the resulting mixture a sufficiently low temperature to form crystals of an addition product of paracresol and 4-picoline, and recovering the crystals from the reaction mixture.

6. The process of obtaining paracresol-quinaldine, which consists in mixing quinaldine and a mixture consisting mainly of metacresol and paracresol with the paracresol predominating, and producing in the resulting mixture a sufficiently low temperature to form crystals of an addition product of paracresol and quinaldine, and recovering the crystals from the reaction mixture.

7. The process of obtaining a compound of paracresol and a pyridine base of the class consisting of 4-picoline, quinaldine, 2,3,6-collidine, and 2,4-dimethylquinoline, which consists in bringing paracresol and the pyridine base together at a temperature sufficiently low to produce crystals of an addition compound of paracresol and the pyridine base, and recovering the crystals from the reaction mixture.

8. The process of obtaining an addition product of paracresol and 4-picoline, which consists in bringing paracresol and 4-picoline together at a temperature sufficiently low to produce crystals of the addition product of paracresol and 4-picoline, and recovering the crystals from the reaction mixture.

9. The process of obtaining an addition product of paracresol and quinaldine, which consists in bringing paracresol and quinaldine together at a temperature sufficiently low to produce crystals of the addition product of paracresol and quinaldine, and recovering the crystals from the reaction mixture.

FRANCIS E. CISLAK.
MERRITT M. OTTO.

REFERENCES CITED

The following references are of record in the file of this patent:

UNITED STATES PATENTS

| Number | Name | Date |
|---|---|---|
| 1,980,901 | Bentley | Nov. 13, 1934 |
| 2,113,951 | Shuman | Apr. 12, 1938 |
| 2,193,336 | Lecher | Mar. 12, 1940 |
| 2,310,616 | Cislak et al. | Feb. 9, 1943 |

OTHER REFERENCES

Chemical Abstracts, 1943, page 3757; ibid., 1916, page 1955.

Journal of Chemical Physics, vol. 5, pages 967–973.

Archiv für exper. Path. und Pharmakologie, vol. 191, pages 55–75 (1939).